United States Patent [19]

Ruta

[11] Patent Number: 4,796,148
[45] Date of Patent: Jan. 3, 1989

[54] CURRENT-SENSING ARRANGEMENT UTILIZING TWO CURRENT-SENSING SIGNALS

[75] Inventor: Joseph W. Ruta, Elmhurst, Ill.

[73] Assignee: S&C Electric Company, Chicago, Ill.

[21] Appl. No.: 791,199

[22] Filed: Oct. 25, 1985

[51] Int. Cl.⁴ ............................................. H02H 3/08
[52] U.S. Cl. ........................................ 361/97; 361/87; 361/96
[58] Field of Search ................... 361/87, 93, 96, 97, 361/102, 35, 36, 45

[56] References Cited

U.S. PATENT DOCUMENTS

| | | | |
|---|---|---|---|
| 3,846,675 | 11/1974 | Shimp | 361/95 |
| 3,976,919 | 8/1976 | Vandevier et al. | 361/96 |
| 4,297,741 | 10/1981 | Howell | 361/93 |
| 4,363,065 | 12/1982 | Hasegawa et al. | 361/87 X |
| 4,409,636 | 10/1983 | Brandt et al. | 361/87 |
| 4,434,415 | 2/1984 | Jarosz et al. | 337/186 |
| 4,443,828 | 4/1984 | Legrand et al. | 361/96 X |
| 4,446,498 | 5/1984 | Stich | 361/87 |
| 4,532,571 | 7/1985 | Satou | 361/93 |

OTHER PUBLICATIONS

L. B. Berkebile, "Digital EHV Current Transducer", IEEE, 80 SM 647-8, 1980.

Primary Examiner—A. D. Pellinen
Assistant Examiner—A. Jonathan Wysocki
Attorney, Agent, or Firm—James V. Lapacek

[57] ABSTRACT

An improved current-sensing arrangement and method are provided for supplying a signal that suitably represents line current over a wide current range. The current-sensing arrangement utilizes the signals from an iron core transformer and an air core transformer along with transition and scaling arrangements to provide the sensed current signal. The range of operation includes currents for which the iron core transformer exhibits saturation effects and currents for which the air core transformer does not contribute to the combined output signal. Additionally, the range of operation includes currents for which both the transformers contribute to the combined output signal. The output of the iron core transformer dominates the combined output signal for low currents, the output of the air core transformer dominates at high currents, and the transition from the domination of the iron core transformer to the air core transformer is gradual and occurs over a mid-range of current with contribution from both transformers. Accordingly, the combined output signal suitably represents the sensed current over a wide current range due to the contribution of the iron core transformer at low currents where no saturation effects are present and the contribution of the air core transformer at high currents with no saturation characteristic; a smooth transition being provided over a wide current range where both transformers contribute to the output and dominant contribution being provided by the transformer that is most accurate for the particular current.

13 Claims, 3 Drawing Sheets

CURRENT-SENSING ARRANGEMENT UTILIZING TWO CURRENT-SENSING SIGNALS

BACKGROUND OF THE INVENTION

1. Field of the Invention

The present invention relates generally to the field of circuit interrupters and control circuits therefor, and more particularly, to an improved current-sensing arrangement and method for providing a signal that suitably represents line current over a wide current range.

2. Description of the Related Art

Arrangements for sensing the current in an AC power line and providing a signal representing the current are shownn in U.S. Pat. No. 4,434,415 and in co-pending, commonly-assigned U.S. patent application Ser. Nos. 506,942 (now U.S. Pat. No. 4,571,658), 658,239, (now U.S. Pat. No. 4,642,724) and 506,944 (now U.S. Pat. No. 4,571,658) filed in the name of J. W. Ruta. For example, FIG. 1 of U.S. Pat. No. 4,434,415 illustrates a current transformer 46 positioned coaxially about a conductive member through which line current is passed. As further disclosed in the aforementioned patent applications, the current transformer is utilized to provide an output signal for use by control circuitry to provide appropriate trip signals in accordance with predetermined time-current characteristics.

As set forth in application Ser. No. 791,195 filed on Oct. 25, 1985, where the control circuit is required to operate over a wide current range, e.g. 400–40,000 amperes rms, the use of an iron core transformer for this wide current range is not practical since the output signal no longer represents the current as the transformer begins to saturate.

Some control arrangements utilize two transformers which function independently of each other. For example, U.S. Pat. No. 4,297,741 utilizes an iron core transformer for providing current signals to long-time and short-time trip circuits while an air core transformer is utilized to develop signals representing the rate of change of the current, di/dt, as an input to an instantaneous trip circuit.

A digital electronic current transducer is disclosed in an article entitled "Digital EHV Current Transducer" by L. B. Berkebile, 1980, IEEE, 80 SM 647-8. A line potential encoder unit is also disclosed and two types of current-driven power supplies are discussed: a saturable current transformer; and a controlled current-switching current transformer.

SUMMARY OF THE INVENTION

It is a principal object of the present invention to provide an improved current-sensing arrangement and method for supplying a signal that suitably represents line current over a wide current range.

It is another object of the present invention to provide a signal representing the AC current in a line over a wide range of current by the use of an iron core transformer and an air core transformer along with scaling and transition circuitry.

These and other objects of the present invention are efficiently achieved by utilizing the signals from an iron core transformer and an air core transformer to provide a combined signal via transition and scaling circuitry that suitably represents the sensed current in an AC power line over a wide current range. The range of operation includes currents for which the iron core transformer exhibits saturation effects and currents for which the air core transformer does not contribute to the combined output signal. Additionally, the range of operation includes currents for which both the transformer contribute to the combined output signal. The output of the iron core transformer dominates the combined output signal for low currents, the output of the air core transformer dominates at high currents, and the transition from the domination of the iron core transformer to the air core transformer is gradual and occurs over a mid-range of current with contribution from both transformers.

Accordingly, the combined output signal suitably represents the sensed current over a wide current range due to the contribution of the iron core transformer at low currents where no saturation effects are present and the contribution of the air core transformer at high currents with no saturation characteristic; a smooth transition being provided over a wide current range where both transformers contribute to the output and dominant contribution being provided by the transformer that is most accurate for the particular current.

BRIEF DESCRIPTION OF THE DRAWING

The invention, both as to its organization and method of operation, together with further objects and advantages thereof, will best be understood by reference to the following specification taken in conjunction with the accompanying drawing in which.

DETAILED DESCRIPTION

Figure 1:
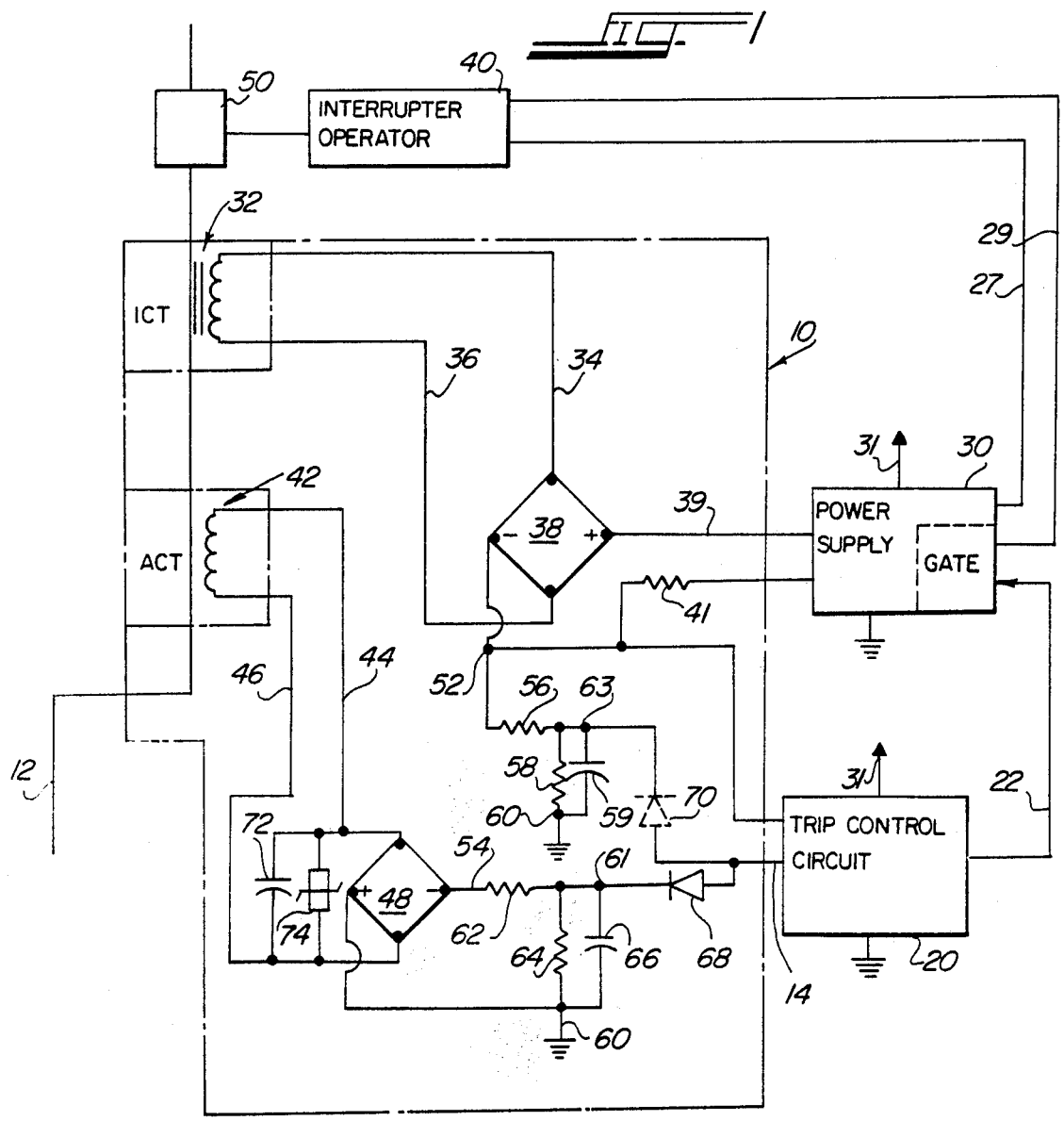
FIG. 1 is a block diagram and schematic representation of the improved current-sensing arrangement of the present invention for use by a control circuit to control operation of a circuit interrupter.

Referring now to FIG. 1, the current-sensing arrangement 10 of the present invention and to practice the method of the present invention is illustrated in a preferred usage to sense the AC current in the line 12 and to provide a signal at 14 representing the sensed current to a trip control circuit 20. The trip control circuit 20 operates in response to the sensed current signal 14 and in accordance with a predetermined time-current characteristic to provide a trip signal at output 22. The trip control circuit 20 is of the type disclosed in the aforementioned, co-pending application Ser. No. 791,195 filed Oct. 25, 1985. The trip signal 22 is provided to a gate of a power supply 30 to control an interrupter operator 40 to operate a circuit interrupter 50.

Figure 2:
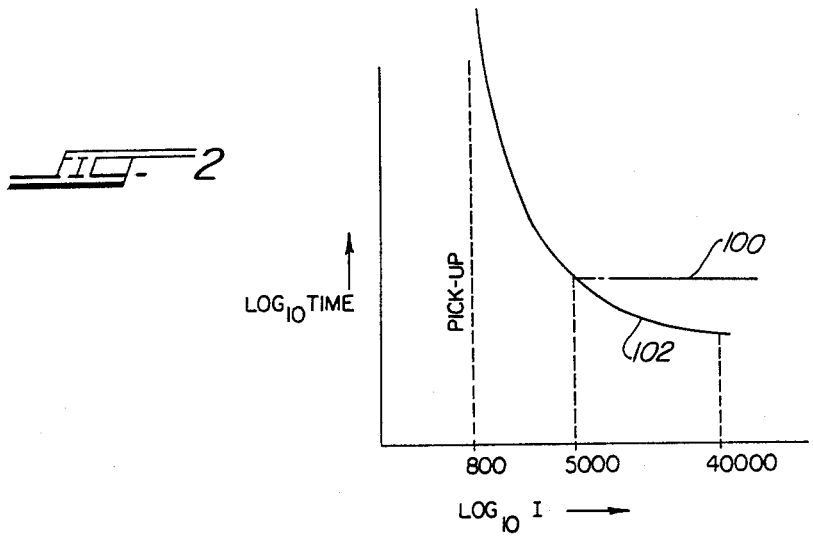
FIG. 2 is a graphic representation of a time-current characteristic curve that is illustrative of the overcurrent conditions for which the control circuit operates the circuit interrupter.

An illustrative example of a time-current characteristic describing the overcurrent conditions which are interrupted by the circuit interrupter 50 in response to the trip signal at 22 is depicted in FIG. 2. The illustrated inverse-time characteristic provides for circuit interruption in the presence of overcurrents such that the time delay is inversely related to the magnitude of the overcurrent. The lowest current at which interruption will be provided is called the pick-up current. In a particular example, the pick-up current is 800 amperes.

If the interrupting range of operation of the trip control circuit 20 is, for example, 800 to 40,000 amperes, the trip control circuit must be provided with a suitable representation of the sensed current for at least the range of interruption operation; for example, from 400–40,000 amperes. If the sensed current signal at 14 does not suitably represent the current over this operating range, the time-current characteristic will be distorted from the desired characteristic. For example, if the signal at 14 does not increase with increasing current after a predetermined current, for example 5000 amperes, then the trip control circuit 20 will operate along the curve portion 100 instead of the desired portion 102.

If an iron core transformer is utilized to provide the signal at 14, saturation effects will cause the signal at 14 to approach a fixed value that no longer represents the sensed current for currents above a certain level; e.g. 5–10 kA. On the other hand, if an air core transformer is utilized, the output at low currents, for example in the range of 400 to 2000 amperes, is such a low level that such a signal is difficult to utilize and does not provide a suitable representation of the current. Further, if the iron core transformer were utilized for a low current range and the air core transformer for a high current range, i.e. in the respective ranges of accuracy, a smooth transition between the two transformers is difficult and neither of the two transformers is particularly accurate in the mid-range of currents; e.g. 4–10 kA.

In accordance with the features of the present invention, the current-sensing arrangement 10 includes an iron core transformer 32 which provides outputs on lines 34,36 to a bridge rectifier 38. Additionally, the current-sensing arrangement 10 includes an air core transformer 42 which provides outputs on lines 44,46 to a bridge rectifier 48. The iron core transformer 32 and the air core transformer 42 are arranged to sense the current in the line 12.

For example, the transformers 32 and 42 are coaxially mounted about a conductor in a cavity referred to by reference numeral 52 in FIGS. 1 and 2 of U.S. Pat. No. 4,434,415. In that case, the transformers 32 and 42 occupy the position of the current transformer 46 as shown in FIG. 1 of that patent.

The output 52 of the bridge 38 and the output 54 of the bridge 48 are scaled and utilized to provide a combined output at 14 with a suitable, gradual transition to supply a suitable representation of the sensed current in the line 12 over a wide current range, e.g. 400 to 40,000 amperes, to the trip control circuit 20. The scaling of each of the outputs 52,54 and the transition regions are arranged such that the output derived from the iron core transformer 32 dominates the output 14 for low currents and the output derived from the air core transformer 42 dominates at high currents. Further, the transition from the domination by the output 52 to the output 54 is gradual so as to occur over a wide mid-range of current over which both outputs 52 and 54 contribute to the signal at 14.

To this end, the output 52 of the bridge 38 is connected through a resistor 56 to a signal point 63 which is connected to the signal output 14. The parallel combination of a resistor 58 and a capacitor 59 is connected between the signal point 63 and the circuit common 60. The resistors 56 and 58 and the capacitor 59 provide filtering and the resistors 56 and 58 provide scaling of the signal at 52 derived from the iron core transformer 32. The output 54 derived from the air core transformer 42 is connected through a resistor 62 to one side 61 of the parallel combination of a resistor 64 and a capacitor 66. The other end of the parallel combination of the resistor 64 and the capacitor 66 is connected to the circuit common 60. The junction of the resistors 62,64 is connected to the cathode of a diode 68, the anode of which is connected to the signal output 14. The resistors 62,64 provide scaling of the signal at 54 derived from the air core transformer 42 and along with capacitor 66 provide filtering. With the provision of the diode 68, the output at 61 derived from the air core transformer 42 contributes to the signal at 14 only when the signal at 61 is greater than the signal at 63 that is derived from the source at point 52 as will be explained in detail hereinafter.

Since the voltage at the output 44,46 of the air core transformer 42 is a voltage representing the instantaneous value of di/dt, the rate of change of the sensed line-current, a capacitor 72 across the output 44,46 decreases the rate effect and filters out the high frequency components. A varistor 74 is connected across the output 44,46 in specific embodiments where it is desirable to limit the peak output voltages to the trip control circuit 20.

Figure 3:
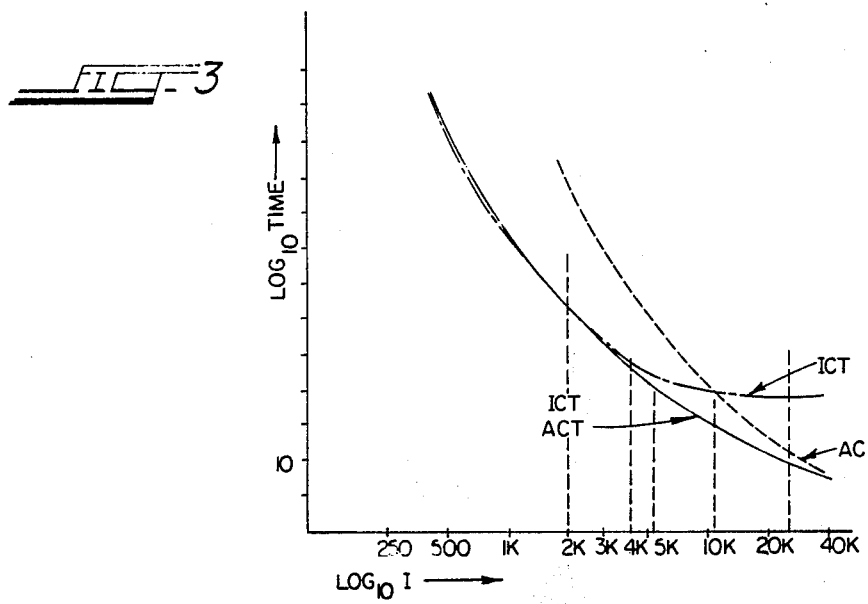
FIG. 3 is a graphic representation of illustrative time-current characteristic curves that are useful in describing the operation of the arrangement of FIG. 1.

Referring now to FIG. 3, the plot ACT for the air core transformer, the plot ICT for the iron core transformer, and the combined ACT and ICT plot represent the respective time-current characteristic curves as derived from the air core transformer 42 alone, the iron core transformer 32 alone, and the combination of both of the individual waveforms at 61 and 63 respectively. The ICT plot illustrates saturation effects starting at 4–5 kA. At higher currents, e.g. 10–40 kA, the signal contributed by the iron core transformer 32 does not represent the current and approaches a fixed value. Additionally, it can also be seen that the ACT plot in the same range of higher current increases with current. Accordingly, at higher currents, the signal at 14 becomes dominated by the output derived from the air core transformer 42. The combined signal at 14 is represented in FIG. 3 by the plot ICT and ACT.

Figure 4:
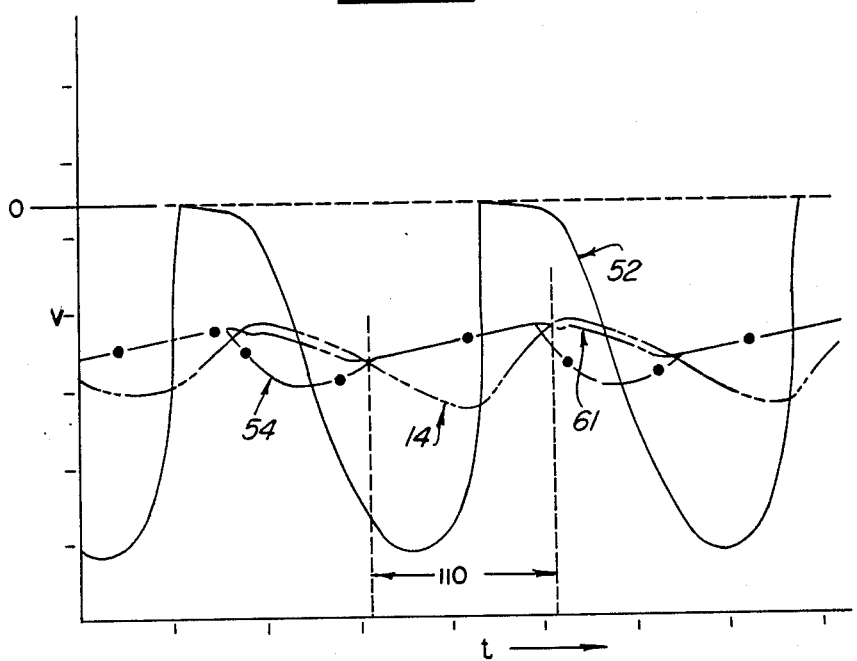
FIGS. 4 and 5 are graphic representations of output waveforms at illustrative points in the arrangement of FIG. 1.
Figure 5:
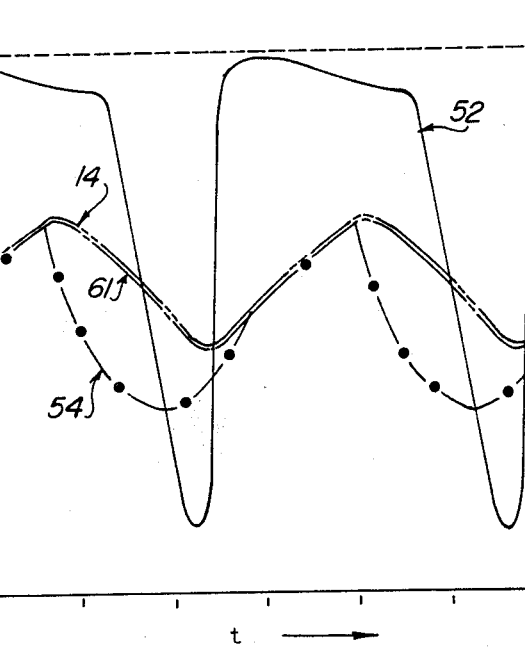

Referring additionally to FIGS. 4 and 5, the plots of amplitude versus current represent the waveforms at the respective points in FIG. 1. Specifically, the waveforms of FIG. 4 correspond to a mid-range current at which the output at 52 derived from the iron core transformer 32 exhibits saturation effects. The output at 52, which is before the filtering and scaling, illustrates the saturation effects. For this mid-range current, the outputs at 54 and 61 that are derived from the air core transformer 42 are significant and contribute to the composite waveform at 14. It should be noted that, as depicted in FIG. 1, the outputs as referenced are negative voltages with respect to the circuit common 50. The waveforms of FIG. 5 correspond to a higher current, e.g. 20–30 kA, at which the output 61 derived from the air core transformer 42 is dominant as can be seen by the near coincidence between the waveform at 61 and the combined output at 14 at all points along the waveforms.

For comparison purposes, note that in FIG. 4 the output 52 that is derived from the iron core transformer 32 is predominant over the output 54 derived from the air core transformer 42. This is illustrated over the range 110 where the signal at 14 is determined by the output at 52 as can be seen by the output 54 being less than the output 14. Accordingly, it should be realized that the combined signal at 14 includes contribution by signals derived from both transformers at different points of the combined waveform at 14 at a given current as dependent on the amplitude of each signal at a paricular time; i.e. at each point along the plots of FIGS. 4 and 5. Further, the combined waveform at 14 also includes contribution from both transformers at various points.

In accordance with the present invention, in addition to utilizing the outputs of both the air core transformer 42 and the iron core transformer 32 and peforming scaling and filtering of the outputs to provide the appropriate combined signal, it should be realized that, as discussed hereinbefore, the change from the dominance by the iron core transformer to the air core transformer is not an abrupt transition as would be performed by switching from the output to another above a particular current.

Further, it should also be noted that the combined signal at 14 is not derived by a simple addition or superpositioning process. Instead, the combined signal at 14 includes contribution from both transformers over a wide mid-range of current at different times in the waveform at 14 for any given current in the range. To this end, the diode 68 at times performs a switching function between the output 61 and the output supplied from 52 through the resistor 56. In circuit terminology, when the output at 61 is more negative than the output at 63, the diode 68 is rendered conductive and the signal at 14 (offset by a diode drop) follows the output at 61 via current flow through the diode 68. Otherwise, the signal at 14 is provided by the output at 52 via the scaling and filtering circuitry. A second diode 70 can be utilized between 63 and 14 but desirable efficiencies and circuit performance are achieved without the diode 70.

Additionally, the output at 44,46 from the air core transformer 42 is 90 degrees out of phase with respect to the output 34,36 from the iron core transformer 32. The outputs being out of phase along with the significant amount of ripple at the outputs 61 and 63 are other factors in the gradual transition from the dominance of the iron core transformer to the air core transformer as the current increases.

In a preferred arrangement, the output of the bridge 38 also provides operating current to the power supply 30 over line 39 and through line 52 via a series resistor 41. The power supply 30 provides operating power to the trip control circuit 20 at output 31. Upon the generation of a trip signal 22, the interrupter operator 40 is supplied with operating energy over the lines 27,29 from the current in the line 39 and from stored energy in the power supply 30. Additionally, the circuit interrupter 50 and the interrupter operator 40 in a specific arrangement are of the type shown in U.S. Pat. No. 4,467,307.

While there have been illustrated and described various embodiments of the present invention, it will be apparent that various changes and modifications will occur to those skilled in the art. For example, it should be realized that in other specific implementations, the two outputs 61 and 63 can be appropriately sampled and/or combined by means of a microprocessor or the like. Additionally, the present invention is also useful in obtaining desirable time-current characteristics by means of various scaling and combining methods of the signals at 52 and 54 or by scaling of the combined signal at 14. It is intended in the appended claims to cover all such changes and modifictions as fall within the true spirit and scope of the present invention.

What is claimed and desired to be secured by Letters Patent of the United States is:

1. A method for providing a signal that suitably represents the current in an AC line over a wide range comprising the steps of:
   rectifying the output from an iron core transformer that senses the line current;
   rectifying the output from an air core transformer that senses the line current;
   filtering and scaling each of the resultant rectified outputs such that the output from the iron core transformer is dominant in the signal with respect to the output drived from the air core transformer over a low current range, and such that the output derived from the air core transformer is dominant in the signal over the output derived from the iron core transformer over a high current range; and
   supplying the signal over a range of currents between the low and high current ranges by combining at each point in time the filtered and scaled outputs such that both of the filtered and scaled outputs contribute significantly to the signal throughout said range of currents between the low and high current ranges.

2. The method of claim 1 wherein said supplying step further comprises the step of comparing the filtered and scaled outputs to each other.

3. The method of claim 2 wherein said supplying step further comprises the step of utilizing the result of the comparing step to determine the appropriate combining of the filtered and scaled outputs.

4. The method of claim 2 wherein said supplying step further comprises the step of providing one of the filtered and scaled outputs as the signal based on said comparing step.

5. The method of claim 1 wherein said filtering and scaling step further comprises scaling each of the rectified outputs in a predetermined manner to provide a desired time-current characteristic when the combined signal is used as the input to a trip signal generator.

6. The method of claim 1 further comprising the step of scaling the combined signal in a predetermined manner to achieve a desired amplitude versus current relationship.

7. A current-sensing circuit comprising:
   an air core transformer arranged to sense the current in an AC line and providing an output;
   an iron core transformer arranged to sense the current in the AC line and providing an output;
   means responsive to said output of said air core transformer and said output of said iron core transformer for rectifying each of said outputs;
   means responsive to said rectifying means for scaling each of said rectified outputs; and
   means responsive to said scaled outputs for combining the amplitudes of said scaled outputs into a combined signal such that both of said scaled outputs contribute significantly to said combined signal throughtout a wide current range.

8. The current-sensing circuit of claim 7 further comprising means responsive to said scaled outputs for filtering said outputs.

9. The current-sensing circuit of claim 7 further comprising a capacitor connected across said output of said air core transformer.

10. The current-sensing circuit of claim 9 further comprising a varistor connected across said output of said air core transformer.

11. A current-sensing arrangement for providing a sensed current signal that suitably represents the sensed current in an AC line over a wide current range, the current-sensing arrangement comprising:

first means responsive to the current in an AC line for providing a first output signal that increases with sensed current and that suitably represents the sensed current in the AC line over a low range of current, at higher mid-range currents said first output signal increasing with increasing current at a lower rate than the rate in the low range, at a high range of current above the mid-range currents said first output signal essentially unchanging for increasing current;

second means responsive to the current in the AC line for providing a second output signal that increases with sensed current and that suitably represents the sensed current in the AC line for said high currents, at said mid-range currents said second output signal reasonably accurately representing the sensed current, at said low currents said second output signal not being usable as an accurate representation of the sensed current; and scaling and outputting means responsive to said first and second output signals for appropriately scaling each of said first and second output signals and for outputting a third output signal that suitably represents the sensed signal over said low-, mid- and high-range currents such that both of said first and second output signals contribute significantly to said third output signal throughout said mid-range currents, said scaling and outputting means further comprising means for comparing said first and second output signals after scaling.

12. A method for providing a signal that suitably represents the line current over a wide current range comprising the steps of:

rectifying the output from a first transformer that senses the line current;

rectifying the output from a second transformer that senses the line current;

filtering and scaling each of the resultant rectified outputs such that the output derived from the first transformer is dominant in the signal with respect to the output derived from the second transformer over a low current range, and such that the output derived from the second transformer is dominant in the signal over the output derived from the first transformer over a high current range; and supplying the signal over a range of currents between the low and high current ranges by combining at each point in time the filtered and scaled outputs such that both of the filtered and scaled outputs contribute significantly to the signal throughout the range of currents between the low- and high-current ranges.

13. A current-sensing circuit comprising:

a first transformer arranged to sense the current in an AC line and providing an output;

a second transformer arranged to sense the current in the AC line and providing an output;

means responsive to said output of said first transformer and said output of said second transformer for rectifying each of said outputs;

means responsive to said rectifying means for scaling each of said rectified outputs; and means responsive to said scaled outputs for combining the amplitudes of said scaled outputs such that both of said scaled outputs contribute significantly throughout a wide current range to provide a signal that represents the sensed current.

* * * * *

UNITED STATES PATENT AND TRADEMARK OFFICE
CERTIFICATE OF CORRECTION

PATENT NO. : 4,796,148
DATED : January 3, 1989
INVENTOR(S) : Joseph W. Ruta

It is certified that error appears in the above-identified patent and that said Letters Patent is hereby corrected as shown below:

Col. 1, line 15, "shownn" should be -- shown --;

Col. 1, line 19, "4,571,658" should be -- 4,605,982 --.

Signed and Sealed this

Eighteenth Day of July, 1989

Attest:

DONALD J. QUIGG

Attesting Officer

Commissioner of Patents and Trademarks